United States Patent [19]

Takanashi et al.

[11] Patent Number: 5,313,288
[45] Date of Patent: May 17, 1994

[54] RECORDING MEDIUM AND RECORDING/REPRODUCTION APPARATUS THEREOF

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki, all of Japan

[73] Assignee: Victor Company of Japan, Ltd., Yokohama, Japan

[21] Appl. No.: 846,800

[22] Filed: Mar. 4, 1992

[30] Foreign Application Priority Data

Mar. 6, 1991 [JP] Japan .................. 3-065657

[51] Int. Cl.5 ............... H04N 1/028; H04N 3/15; G02F 1/135
[52] U.S. Cl. ............................ 358/471; 359/72; 359/83; 359/51; 348/280; 348/338; 348/751
[58] Field of Search ........... 358/229, 213.11, 213.13, 358/225, 471, 474, 482; 359/72, 83, 51; 430/55, 56, 58

[56] References Cited

U.S. PATENT DOCUMENTS 3,872,050  3/1975  Benton et al. .................. 359/51
4,865,935  9/1989  Veda ............................. 430/58

FOREIGN PATENT DOCUMENTS 57-70522   5/1982  Japan .................. G02F 1/133
57-188024 11/1982  Japan .................. G02F 1/135
63-124024  5/1988  Japan .................. G02F 1/133
1-190178   7/1989  Japan .
2-222924   9/1990  Japan .

Primary Examiner—Edward L. Coles, Sr.
Assistant Examiner—Scott A. Rogers
Attorney, Agent, or Firm—Michael N. Meller

[57] ABSTRACT

A recording medium has first and second transparent electrodes, a photoconductive layer member and a photomodulation member. The recording medium also has a first lamination member having a first substrate on which the first transparent electrode and the photoconductive layer member are laminated in order, a second lamination member having a second transparent substrate on which the second transparent electrode and the photomodulation layer member are laminated in order and coupling members for unifying the first and second lamination members together with a gap of specific width in such a manner that the photoconductive and photomodulation layer members face each other.

2 Claims, 4 Drawing Sheets

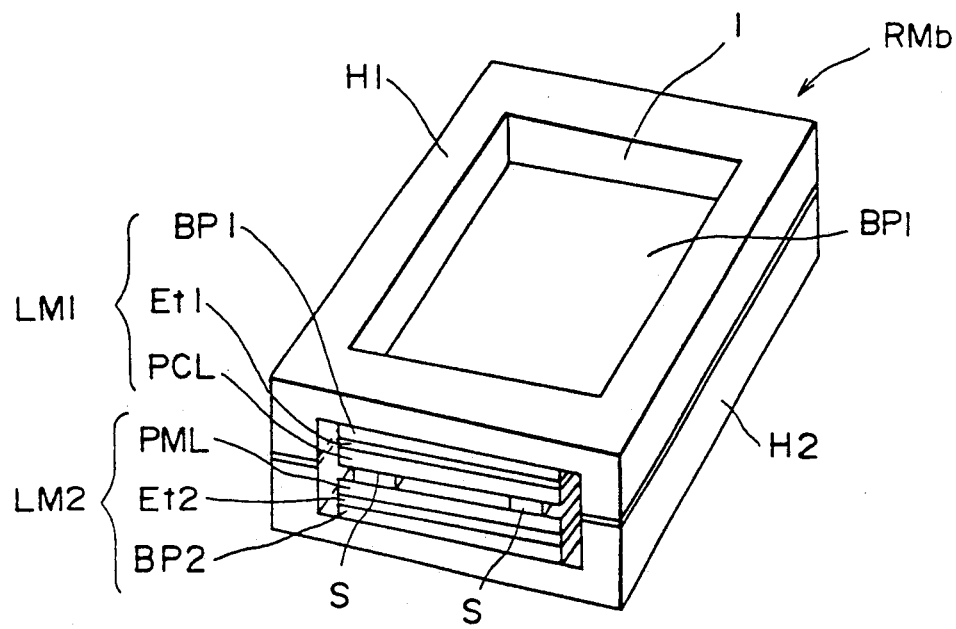
F I G. 3
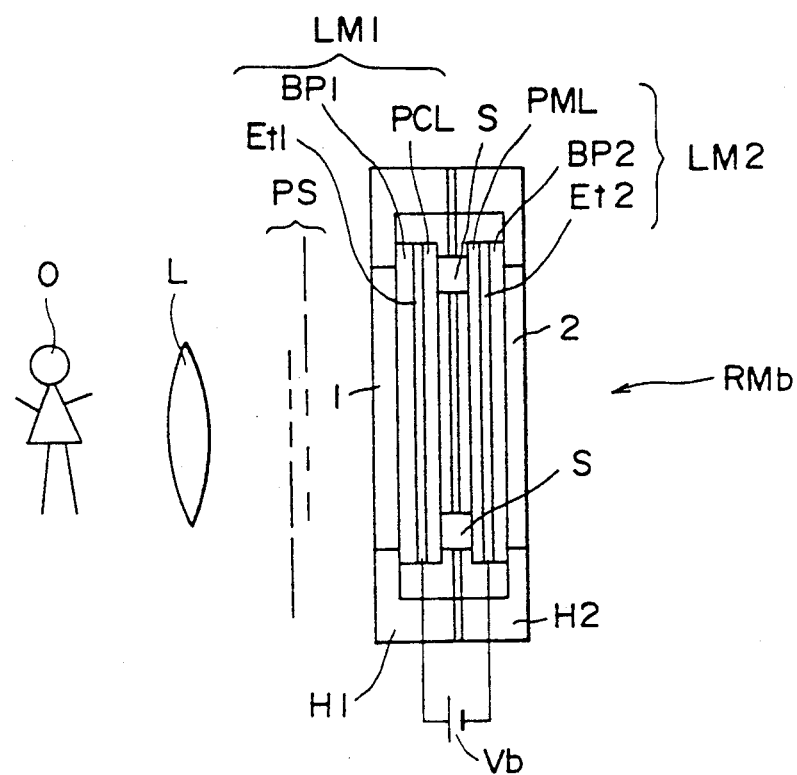
F I G. 4

RECORDING MEDIUM AND RECORDING/REPRODUCTION APPARATUS THEREOF

BACKGROUND OF THE INVENTION

The present invention relates to recording media and recording/reproduction apparatus thereof.

The use of image signals that have been generated to correspond to an optical image of an object facilitates the performance of edit, trimming and ocher image processing in the status of electrical signals, and also facilitates the recording and reproduction through the use of a recording material for which the recorded signals can be erased. In an image pickup apparatus, an optical image of an object and that has been formed on a photoelectric conversion portion of an image sensor by an image pickup lens, is converted into electrical image information. Then, this electrical image information is outputted as linear image signals on a time axis. Various types of image pickup tubes and solid state image sensors have been conventionally used as the image sensor described above.

When the image sensor for the generation of image signals for a high-quality and high resolution reproduced image, is an image pickup tube, there is a limit to the degree of fineness of the electron beam diameter in the image pickup tube and so the target capacity of the image pickup tube must be increased so as to correspond to the target area and thus it is not possible to obtain a high resolution. In addition, for example, in case of a color image pickup apparatus for moving picture, there is a problem of the signal-to-noise ratio because the frequency bandwidth of the image signals accompanying high resolution becomes greater than several tens of MHz to several hundreds of MHz. For these reasons, when an image pickup tube in a color image pickup apparatus is used, there are difficulties in generating such image to signals that it is possible to reproduce high-quality and high-resolution reproduced images.

In addition, in a conventional image sensor, after the electrical signals that have been generated by the optical-electrical conversion of the optical information that is the object of recording, have been sent as image signals, image signals corresponding to a new optical image of the object are generated. There is no function for the storage of electrical signals produced in accordance with successive images of object in the image sensor itself. Therefore, image signals that have been generated by the image sensor are for example, stored in a magnetic recording apparatus.

A recording apparatus shown in FIG. 1 is provided with a write head WH, a recording medium RM, an image pickup lens L and a power source Vb. In the write head WH, a transparent electrode Etw and a photoconductive layer member PCL are laminated onto a transparent substrate BPw. In the recording medium RM, a transparent electrode Err and a photomodulation layer member PML are laminated onto a substrate BPr.

Spacers S, S are inserted between the photoconductive layer member PCL in the write head WH and the photomodulation layer member PML in the recording medium RM, and the write head WH and the recording medium RM are maintained by a specific gap. The recording medium RM can move in the direction indicated by an arrow Y. A voltage generated by the power source Vb in the figure, is impressed across the transparent electrode Err tn the recording medium RM and the transparent electrode Etw in the write head WH at the time of recording operation.

The following is a description of the recording operation of the recording apparatus shown in FIG. 1. First, the voltage from the power source Vb is supplied across the transparent electrode Etw and the transparent electrode Err. When the optical image of an object O is formed on the photoconductive layer member PCL of the write head WH by the image pickup lens L, the impedance of the photoconductive layer member PCL changes in accordance with the light intensity of the optical image of the object O. This causes the aerial discharge exhibiting the intensity distribution corresponding to the optical intensity of the optical image of the object O, in the gap between the photomodulation layer member PML and the photoconductive layer member PCL. As a result, the electrical charge pattern corresponding to the optical image is formed on the surface of the photomodulation layer PML. An electrical field corresponding to the electrical charge pattern is then generated and impressed to the photomodulation layer member PML, and recording of the optical image of the object O is performed with respect to the photomodulation layer member PML.

FIG. 1 shows the case where the recording medium RM is formed in a card form, for example. When a recording operation is completed to one portion of the recording medium RM, the recording medium RM moves in the direction indicated by the arrow Y so that another portion faces the write head WH which performs successive recording of information.

In a recording apparatus shown in FIG. 2, in a recording medium RMa, a transparent electrode Et1, photoconductive layer member PCL, photomodulation layer member PML, transparent electrode Et2 and a substrate BP2 are laminated onto a transparent substrate BP1. A voltage generated by a power source Vb in the figure, is impressed to across the transparent electrode Et1 and the transparent electrode Et2 at the time of recording operation.

The following is a description of the recording operation of the recording apparatus shown in PIG. 2. First, a voltage generated by the power source Vb is supplied across the transparent electrode Et1 and the transparent electrode Et2. When the optical image of the object O is formed on the photoconductive layer member PCL of the recording medium RMa by an image pickup lens L, the impedance of the photoconductive layer member PCL changes in accordance with the optical intensity of the optical image of the object O. This causes, an electrical charge pattern corresponding to the optical image of the object O to be is formed at the boundary of the photoconductive layer member PCL and the photomodulation layer member PML. An electrical field corresponding to the electrical charge pattern is generated and impressed to the photomodulation layer member PML, and recording of the optical image of the object I is performed with respect to the photomodulation layer member PML.

The reproduction of the image recorded in the manner described above is performed by the irradiation of light for reproduction to the photomodulation layer member PML. Then, the reproduction light is photomodulated in accordance with the recorded image and it is possible to obtain a reproduced image as a result.

In the recording apparatus shown in FIG. 1, when the recording medium RM moves in the direction indicated by the arrow Y in the figure, the gap between the photomodulation layer member PML in the recording medium RM and the photoconductive layer member PCL in the write head WH is apt to change and so it is difficult to perform favorable recording.

In addition, with the recording medium RMa used in the recording apparatus shown in FIG. 2, it has the laminated configuration member described above and so when an organic type of photosensitive material such as an azo-pigment or the like is used as the photoconductive layer member PCL and a plymer dispersed liquid crystal film is used as the photomodulation layer member PML, the organic photosensitive substance is dissolved by the liquid crystal.

SUMMARY OF THE INVENTION

An object of the present invention is to provide a recording medium a gap of which provided between photoconductive and photomodulation members does not change and recording/reproduction apparatus using the recording medium.

The recording medium according to the present invention has first and second transparent electrodes, a photoconductive layer member and a photomodulation member.

The recording medium also has a first lamination member having a first transparent substrate on which the first transparent electrode and the photoconductive layer member are laminated in order, a second lamination member having a second transparent substrate on which the second transparent electrode and the photomodulation layer member are laminated in order and coupling members for unifying the first and second lamination members together with a gap of specific width in such a manner that the photoconductive and photomodulation layer members face each other.

The recording apparatus according to the present invention has a first lamination member having a first transparent substrate on which the first transparent electrode and the photoconductive layer member are laminated in order, a second lamination member having a second transparent substrate on which the second transparent electrode and the photomodulation layer member are laminated in order, coupling members for unifying the first and second lamination members together with a gap of specific width in such a manner that the photoconductive and photomodulation layer members face each other, a power source for applying a specific voltage across the first and second transparent electrodes and an image pickup lens for converging light from an object to be recorded onto the photoconductive layer member via the first transparent electrode when the voltage is applied across the first and second transparent electrodes, thus forming an optical image of the object on the photoconductive layer member, wherein an impedance of the photoconductive layer member changes according to an optical intensity of the optical image to generate an aerial discharge exhibiting intensity distribution according to the impedance changing, thus a charge image corresponding to the optical image is formed, by the discharge, on the photomodulation layer member which faces the photoconductive layer member, to generate an electrical field corresponding to the charge image, the electrical field being applied to the photomodulation layer member to record the optical image to the photomodulation layer member.

The reproduction apparatus according to the present invention has a first lamination member having a first transparent substrate on which the first transparent electrode and the photoconductive layer member are laminated in order, a second lamination member having a second transparent substrate on which the second transparent electrode and the photomodulation layer member are laminated in order, coupling members for unifying the first and second lamination members together with a gap of specific width in such a manner that the photoconductive and photomodulation layer members face each other, wherein the first and second lamination members constitute a recording medium so that an optical image of an object is recorded to the photomodulation layer member by applying an electrical field of a specific field intensity across the gap, a lens for converging an emitted light from the second transparent electrode, the emitted light being photomodulated according to the recorded optical image, when light for reproduction is applied to the recording medium from the first transparent electrode side and a photo-electric converter, responsive to the emitted light, for generating an electric signal corresponding to the emitted light, thus the optical image being reproduced as the electric signal.

Other objects and advantages of the present invention will become apparent from the detailed description to follow taken in conjunction with the appended claims.

BRIEF DESCRIPTION OF THE DRAWINGS

FIG. 3 is a perspective view showing an outline configuration of a first embodiment of the recording medium of the present invention;

FIG. 4 is an elevational sectional view showing an outline configuration of the recording apparatus using the recording medium shown in FIG. 3;

DETAILED DESCRIPTION OF THE EMBODIMENTS

Figure 1:
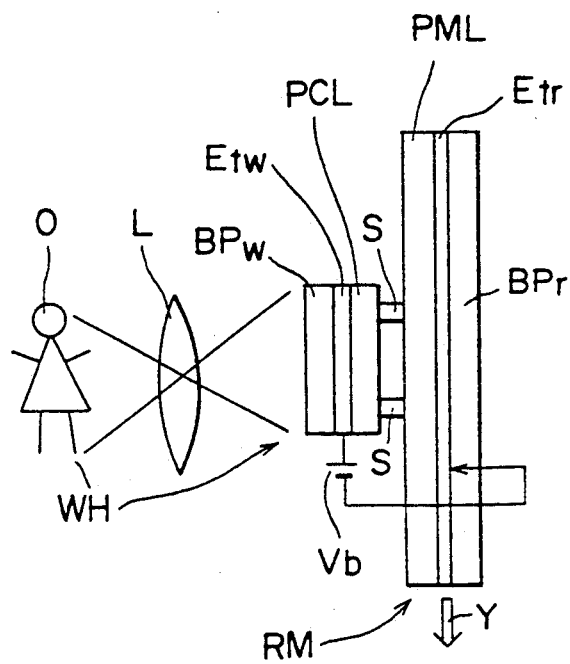
FIG. 1 is an elevational sectional view showing an outline configuration of a recording apparatus using a conventional recording medium.
Figure 2:
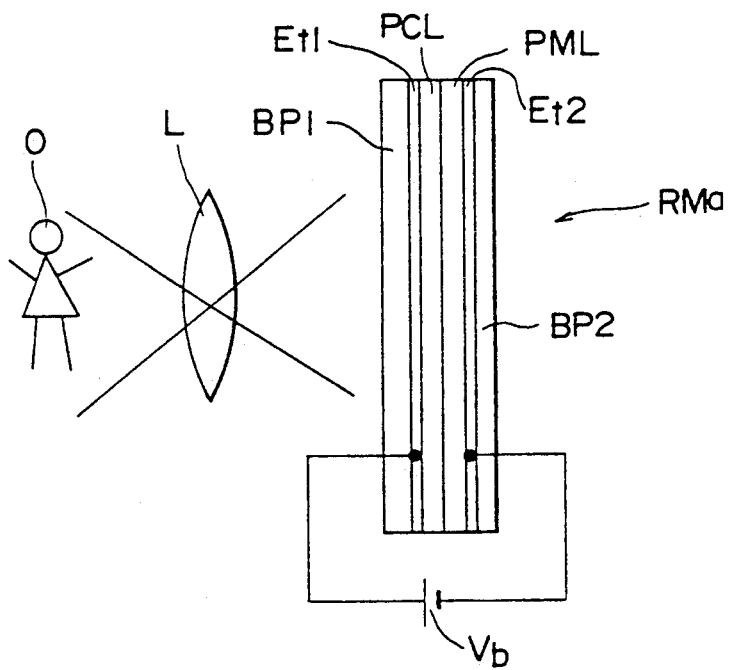
FIG. 2 is an elevational sectional view showing an outline configuration of another recording apparatus using a conventional recording medium.

A recording medium RMb of the present invention and shown in FIG. 3 is formed in the manner described below. First, a transparent electrode Et1 and a photoconductive layer member PCL are laminated onto a transparent substrate BP1 to form a first lamination member LM1. Then, a transparent electrode Et2, a photomodulation layer material PML (using a liquid crystal, PLZY (lead lanthanum zirconate titanate), a polymer dispersed liquid crystal film or some other photomodulation layer member configured using other photomodulation materials), are laminated onto a transparent substrate BP2 to form a second lamination member LM2. The first and the second lamination members LM1 and LM2 are then mounted to holders H1 and H2, respectively and between the first and the second lamination members LM1 and LM2 are inserted spacers S, S. Then, the holders H1 and H2 are unified and the coupling of the holders H1 and H2 is performed by a known method.

In the recording medium RMb shown in FIG. 3, the gap between the photoconductive layer member PCL of the first lamination member LM1 and the photomodulation layer member PML of the second lamination member LM2 is maintained constant by the spacers S, S and so it possible to perform favorable recording with respect to the recording medium RMb by performing recording of the optical image of an object O from a recording apparatus shown in FIG. 4. In addition, because the gap between the photoconductive layer member PCL and the photomodulation layer member PML is maintained constant by the spacers S, S, there arises no dissolving of an organic photosensitive substance due to the liquid crystal in the photomodulation layer member PML even when an organic photosensitive substance of arc pigment, for example, and a polyemr dispersed liquid crystal film are used as the photoconductive layer member PCL and the photomodulation layer member PML, respectively.

The recording apparatus shown in FIG. 4 is provided with the recording medium RMb shown in FIG. 3, an image pickup lens L, an optical shutter PS and a power source Vb.

The following is a description of the recording operation of the recording apparatus shown in FIG. 4. First, a voltage is supplied from a power source Vb across the transparent electrode Et1 of the first lamination member LM1 and to the transparent electrode Et2 of the second lamination member LM2, and when the optical shutter PS is opened, the light of an object O passes through the image pickup lens L and an opening portion 1 of the holder H1 and forms an optical image on the photoconductive layer member PCL. When this occurs, the impedance of the photoconductive layer member PCL changes in accordance with the light intensity of the optical image of the object O. Then, there arises an aerial discharge exhibiting the intensity distribution corresponding to the optical intensity of the optical image of the object O, in the gap between the photomodulation layer member PML and the photoconductive layer member PCL. AS a result, an electrical charge pattern corresponding to the optical image of the object O is formed on the photomodulation layer member PML that opposes the photoconductive layer member PCL. An electrical field corresponding to the electrical charge pattern is then generated and this is impressed to the photomodulation layer member PML and recording of an optical image of the object O is performed with respect to the photomodulation layer member PML. When a polymer dispersed liquid crystal film is used as the photomodulation layer member PML, and as described above, light for reproduction is applied to the recording medium RMb, that light for reproduction receives photomodulation by the information that in recorded to the polymer dispersed liquid crystal film and is emitted from the recording medium RMb.

In FIG. 4, when a recording operation is completed to one portion of the recording medium RMb if made in a card form for example, the recording medium RMb moves in the same direction as indicated by the arrow Y in FIG. 1 so that another portion faces the image pickup lens L for successive recording of information.

Figure 5:
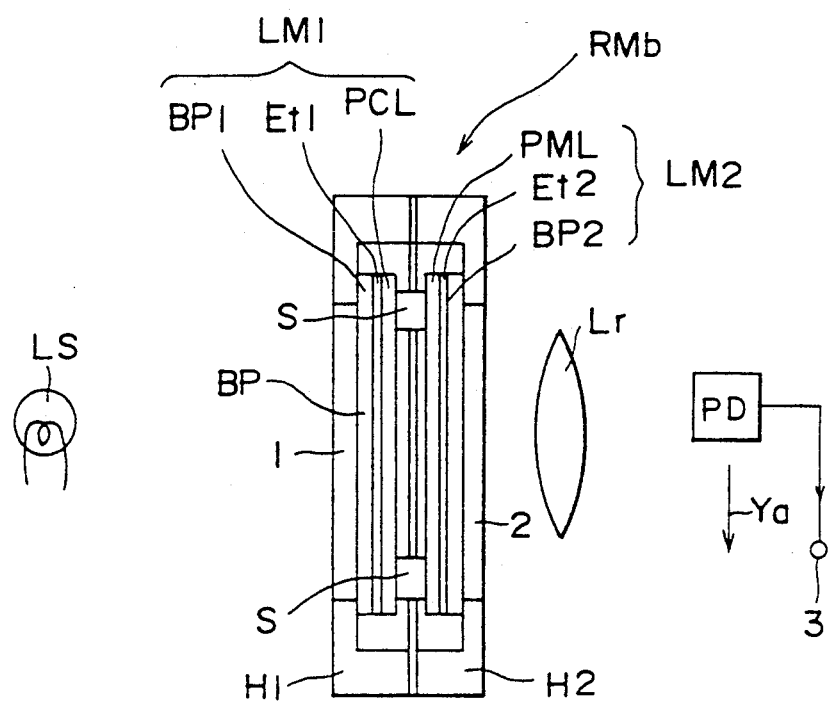
FIG. 5 is an elevational sectional view showing an outline configuration of the reproducing apparatus using the recording medium shown in FIG. 3.

FIG. 5 is a view showing one example of a reproduction apparatus using the recording medium RMb shown in FIG. 3. Other than the recording medium RMb, the reproduction apparatus is provided with a light source LS, a lens Lr, and a photo-electric converter PD. When the light for reproduction from the light source LS is irradiated to the recording medium RMb for which recording has been performed as described above from the side of the opening portion 1 of the holder H1, the light for reproduction passes through the recording medium RMb and is emitted from the opening of the holder H2 and is irradiated to the lens Lr. When the photomodulation layer member PML of the recording medium RMb comprises a polymer dispersed liquid crystal film of a scattering type, the light for reproduction from the photomodulation layer member PML receives intensity modulation in accordance with the recorded information, and the intensity-modulated light is focussed by the lens Lr, undergoes photo-electric conversion by the photo-electric converter PD that moves in the direction of secondary scan as indicated by an arrow Ya and generates electric signals which are outputted from a terminal 3. When the photomodulation layer member PML has a nature whereby the direction of polarization of the light for reproduction is changed by the recorded information, a detector is placed in the optical path between the recording medium RMb and the photo-electric converter PD and the light for reproduction and which is irradiated to the photoelectric converter PD is intensity-modulated by the recorded information.

Figure 6:
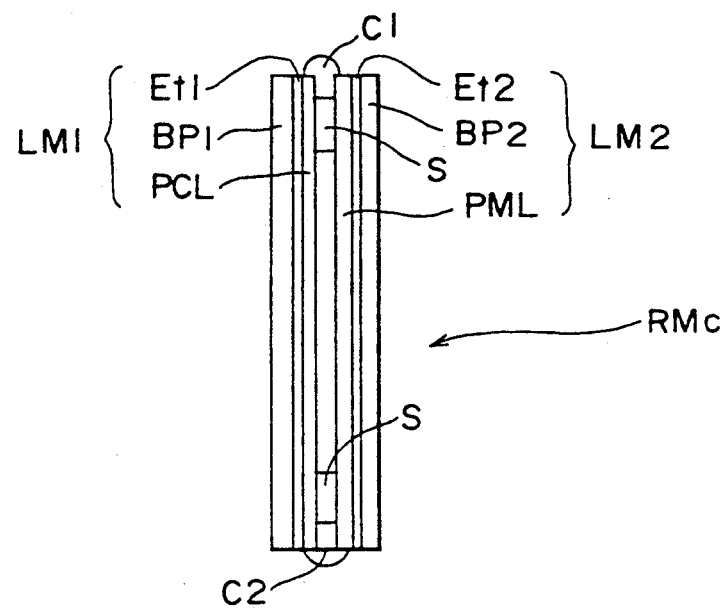
FIG. 6 is a perspective view showing an outline configuration of another embodiment of the recording medium of the present invention.
Figure 7:
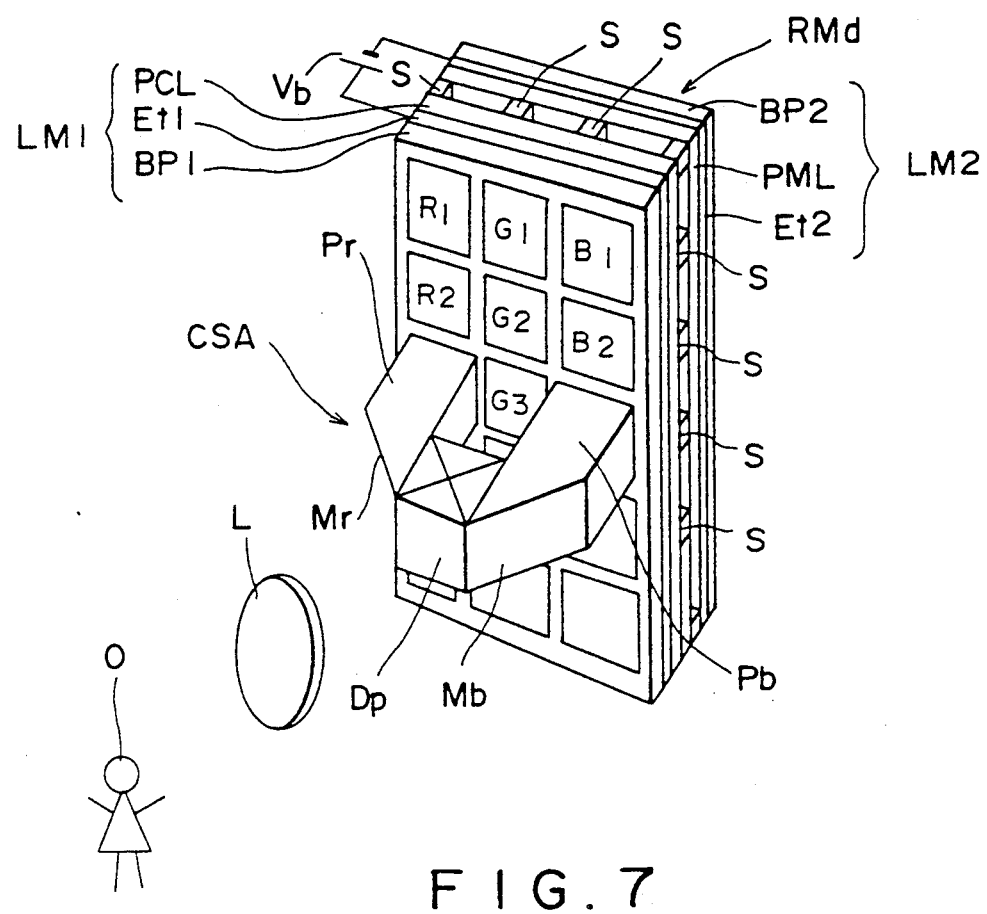
FIG. 7 is an elevational sectional view showing an outline configuration of an apparatus that performs the recording of color images using the recording medium of the present invention.

In FIGS. 6 and 7, each of a recording medium RMc and a recording medium RMd has a first lamination member LM1 that has a transparent electrode Et1 and a photoconductive layer member PCL laminated onto a transparent substrate BP1, and a second lamination member LM2 that has a transparent electrode Et2 and a photomodulation layer member PML laminated onto a transparent substrate BP2, and with the first lamination member LM1 and the second lamination member LM2 being separated by spacers S, S and forming one unit. In the recording medium RMc shown in FIG. 6, fixing portions C1 and C2 using adhesives couple the first lamination member LM1 and the second lamination member LM2 to form a single unit. In addition, in the recording medium RMd shown in FIG. 7, the adhesion of both ends of the spacers S, S to the first lamination member LM1 and the second lamination member LM2 couples the lamination members LM1 and LM2 to form a single unit.

FIG. 7 shows an outline configuration of an apparatus that performs the recording of color images using the recording medium of the present invention. Other than the recording medium RMd, this recording apparatus is provided with a three-color separation optical system CSA, an image pickup lens L and a power source Vb.

In this recording apparatus, the optical image of an object O passes through the image pickup lens L and the three-color separation optical system CSA and forms an image on the photomodulation layer member PML of the information recording medium RMd. The three-color separation optical system CSA is configured from a prism-shaped dichroic mirror (dichroic prism)

Dp, a prism Pr having a total reflection surface Mr, and a prism Pb having a total reflection surface Mb. The dichroic prism Dp is configured so that a dichroic mirror (R-surface) that passes the blue-colored light and the green-colored light and that reflects the red-colored light, intersects a dichroic mirror (B-surface) which passes the red-colored light and the green-colored light and which reflects the blue-colored light.

In FIG. 7, when the light from the object O is irradiated to the dichroic prism Dp via the image pickup lens L, of the light incident upon the dichroic prism Dp, the green-color component of the optical image of the object O and which passes both the dichroic mirror (R-surface) and the dichroic mirror (B-surface) forms an image on an image forming surface G. In addition, of the light incident upon the dichroic prism Dp, the red-color component of the optical image of the object O and which is reflected by the dichroic mirror (R-surface) is reflected by the total reflection surface Mr of the prism Pr and passes through the prism Pr and forms an image on an image-forming surface R which is flush with the image forming surface G and is in the vicinity of the image forming surface G. Furthermore, of the light incident upon the dichroic prism Dp, the blue-color component of the optical image of the object O and which is reflected by the dichroic mirror (B-surface) is reflected by the total reflection surface Mr of the prism Pb and passes through the prism Pb forms an image on an image-forming surface B which is flush with the image forming surfaces G and R and is in the vicinity of the image forming surfaces G and R. (In FIG. 7, R1, G1, B1, R2, G2, B2, . . . are recording regions that are formed on the image-forming surfaces R, G, B for respective primary colors.)

As a result, the optical images of the object O which are three-color separated by the three-color separation optical system CSA are formed by the image pickup lens L in parallel on the recording medium RMd.

When a voltage generated by the power source Vb is supplied across the transparent electrode Et1 in the first lamination member LM1 and the transparent electrode Et2 in the second lamination member LM2, the optical images of the object O are formed on the photoconductive layer member PCL by the image pickup lens L. When this occurs, the impedance of the photoconductive layer member PCL changes in accordance with the optical images of the object O and there arises the aerial discharge indicating the intensity distribution corresponding to the optical images of the object O, in the gap between the photoconductive layer member PCL and the photomodulation layer member PML. As a result, an electrical charge pattern corresponding to the optical images of the object O is formed on the surface of the photomodulation layer member PML opposite the photoconductive layer member PCL. Then, an electrical field corresponding to that electrical charge pattern is formed and is impressed to the photomodulation layer member PML and recording of the optical images of the object O is performed to the photomodulation layer member PML. In this embodiment, the optical images of the object O are color separated into three primary colors and then recording of images corresponding to the optical images of the three colors is performed to the photomodulation layer member PML.

In the recording media RMC and RMd shown in FIGS. 6 and 7, the first lamination member LM1 that has the transparent electrode Et1 and the photoconductive layer member PCL laminated onto the transparent substrate BP1, and the second lamination member LM2 that has the transparent electrode Et2 and the photomodulation layer member PML laminated onto the transparent substrate BP2, are formed into one unit by the spacers S, S and the gap between the photomodulation layer member PML and the photoconductive layer member PCL is maintained constant by these spacers. Accordingly, as has already been described, favorable recording is performed to these recording media. In addition, the photoconductive layer member PCL and the photomodulation layer member PML are separated by the spacers S, S, there arises no dissolving of an organic photosensitive substance due to the liquid crystal in the photomodulation layer member PML even when an organic photosensitive substance of azo pigment, for example, and a polymer dispersed liquid crystal film are used as the photoconductive layer member PCL and the photomodulation layer member PML, respectively.

What is claimed is:

1. A recording medium having first and second transparent electrodes, a photoconductive layer member and a photomodulation member, comprising:

a first lamination member having a first transparent substrate on which the first transparent electrode and the photoconductive layer member are laminated in order;

a second lamination member having a second transparent substrate on which the second transparent electrode and the photomodulation layer member are laminated in order; and coupling members for unifying the first and second lamination members within said recording medium to establish a fixed spaced apart relationship between said members with an air gap of specific width in such a manner that the photoconductor and photomodulation layer members face each other to permit an aerial discharge across said gap upon the application of a voltage between said electrodes.

2. A recording medium according to claim 1, wherein the photoconductive layer member includes an organic photosensitive substance of azo pigment and photomodulation layer member includes polymer dispersed liquid crystal film.

* * * * *